(12) United States Patent
Flateland

(10) Patent No.: US 11,400,993 B2
(45) Date of Patent: Aug. 2, 2022

(54) FOOTREST ARRANGEMENT FOR A MOTORCYCLE

(71) Applicant: Kai Ingvald Flateland, Dølemo (NO)

(72) Inventor: Kai Ingvald Flateland, Dølemo (NO)

( * ) Notice: Subject to any disclaimer, the term of this patent is extended or adjusted under 35 U.S.C. 154(b) by 98 days.

(21) Appl. No.: 16/967,638

(22) PCT Filed: Jan. 24, 2019

(86) PCT No.: PCT/NO2019/050017
§ 371 (c)(1),
(2) Date: Aug. 5, 2020

(87) PCT Pub. No.: WO2019/156569
PCT Pub. Date: Aug. 15, 2019

(65) Prior Publication Data
US 2021/0086856 A1 Mar. 25, 2021

(30) Foreign Application Priority Data
Feb. 6, 2018 (NO) .................................. 20180190

(51) Int. Cl.
*B62J 25/06* (2020.01)
(52) U.S. Cl.
CPC ...................... *B62J 25/06* (2020.02)
(58) Field of Classification Search
CPC ........................................................ B62J 25/06
USPC ........................................................ 280/291
See application file for complete search history.

(56) References Cited

U.S. PATENT DOCUMENTS

| | | | | |
|---|---|---|---|---|
| 6,957,821 | B2* | 10/2005 | Gorman | B62J 25/06 280/291 |
| 8,870,207 | B2* | 10/2014 | Parvey | B62J 25/06 280/166 |
| 9,994,286 | B2* | 6/2018 | Imai | B62K 23/08 |
| 11,148,751 | B2* | 10/2021 | Laberge | B62J 25/06 |
| 2004/0200312 | A1 | 10/2004 | Buckhouse et al. | |
| 2005/0012300 | A1 | 1/2005 | Egan | |
| 2012/0091687 | A1 | 4/2012 | Crain | |
| 2012/0274045 | A1 | 11/2012 | Bruggemann | |
| 2012/0286494 | A1 | 11/2012 | Houser, Jr. et al. | |
| 2013/0043668 | A1 | 2/2013 | Allredd, III | |
| 2015/0274235 | A1 | 10/2015 | Nozoe | |

(Continued)

FOREIGN PATENT DOCUMENTS

EP 0826584 3/1998
JP S60244682 12/1985
(Continued)

OTHER PUBLICATIONS

Norwegian Search Report for NO 20180190, dated Aug. 29, 2018.
(Continued)

*Primary Examiner* — Kevin Hurley
*Assistant Examiner* — Hosam Shabara
(74) *Attorney, Agent, or Firm* — Andrus Intellectual Property Law, LLP

(57) ABSTRACT

A footrest arrangement is for a motorcycle, wherein the footrest arrangement comprises at least two or more individually pivotable footrest devices with footrest surfaces placed with an internal spacing between them so a motorcycle rider can choose whether to rest his foot on one or more of the footrest surfaces simultaneously.

26 Claims, 4 Drawing Sheets

(56) References Cited

U.S. PATENT DOCUMENTS

2018/0001951 A1   1/2018   May

FOREIGN PATENT DOCUMENTS

JP      H03139481        6/1991
JP        H0788186 B2 *  9/1995   .............. B62J 25/06

OTHER PUBLICATIONS

The International Search Report and Written Opinion for PCT/NO2019/050017, dated Apr. 2, 2019.
Response to the Written Opinion for PCT/NO2019/050017, filed Jul. 8, 2019.
Written Opinion for PCT/NO2019/050017, dated Oct. 24, 2019.
International Preliminary Report on Patentability for PCT/NO2019/050017, dated Jan. 3, 2020.

* cited by examiner

FOOTREST ARRANGEMENT FOR A MOTORCYCLE

CROSS-REFERENCE TO RELATED APPLICATIONS

This application is the U.S. national stage application of International Application PCT/NO2019/050017, filed Jan. 24, 2019, which international application was published on Aug. 15, 2019, as International Publication WO 2019/156569 in the English language. The International Application claims priority of Norwegian Patent Application No. 20180190, filed Feb. 6, 2018. The international application and Norwegian application are both incorporated herein by reference, in entirety.

FIELD OF THE INVENTION

The present invention relates to a footrest arrangement for a motorcycle.

BACKGROUND OF THE INVENTION

While riding a motorcycle in challenging terrain, it is often beneficial to use a standing riding position, with all weight transferred to the motorcycle chassis through the two footpegs, as this riding style increases stability, balance and maneuverability. However, this riding style requires more effort from the rider, as most of the forces used to stabilize the rider while standing on the pair of footpegs, will have to be transferred through the rider's upper body.

In the early days of motorcycling, the riders were offered footboards to place their feet on while riding. This solution is still used on some heavy cruiser motorcycles. One would expect it to be more stable to stand on a pair of footboards than standing on a pair of footpegs. But the dominating solution for all kinds of modern motorcycles is a pair of footpegs, one for each foot. For all motorcycles intended for rough roads or off-road use, this is the only solution offered by the motorcycle manufacturers. As a safety precaution, the footpegs on motorcycles are usually foldable, pivoting around a footpeg pivot bolt. The pivot bolt is slanted, so the footpeg will fold upwards and backwards at the same time when hit by rocks or any other object. If a footboard was used, with a pivoting functionality based on a slanted pivot bolt, this would cause problems. If the footboard was extended in front of the pivot axis, the end of the footboard would actually swing out with respect to the original position, hence be even more prone to getting caught by trees etc. If the footboard where extended backward with respect the pivot bolt, the end of the footboard will hit the motorcycle chassis before the floorboard is properly out of the way. This would of course be dependent on the length of the footboard. Another reason for not using footboards on off-road motorcycles is that they would quickly become filled with dirt and become slippery. And a footboard would possibly prevent the use of a kick starter arrangement.

Especially for off-road motorcycles, a recent trend in the aftermarket is wider footpegs than the original, to enhance rider stability. Another trend for extreme off-road motorcycles is various means to increase friction between the inside of the rider's knee, and the bike bodywork. An example of this is the Australian company "Stegpegz", whose solution is a bracket attached to each side of the motorcycle, with a small rubber peg some distance below the knee, which the rider can rest the leg against, or pass by when necessary. Another solution is called "PivotPegz". These footrest surface are rotating around a horizontal axis, in addition to the traditional slanted pivot axis in the vertical plan. The constant contact between foot and footpeg independent of foot angle caused by this, is supposed to increase rider stability.

Two variants of the footboard concept do exist in the market, however. One is a footpeg marketed as "Ankle saver". Basically, it is a standard foldable footpeg, with an integrated structure extending in the direction towards the rear wheel, with a defined footrest surface in the end.

The small rear footrest surface is placed significantly lower than the main footrest surface, hence it is not designed to offer the rider heel support while riding normally, it is designed to stop the heel from going too far down below the footrest surface in a hard landing, with a possible ankle injury as result. The existence of this product reveals that the generic solution with one footpeg on each side of the motorcycle may implicit increased risk for ankle injuries after jumping with off-road motorcycles. In order to maintain the foldable functionality, the extension rearwards is quite short, and pointing downwards/outwards. The potential for increased rider support is thus limited by these geometrical constraints, whereas there are no such limitations for the invention presented here.

The prior art represented by the product "Ankle Saver", is described in US patent US2012091687. Another example of prior art is US Patent US2005012300. This patent describes a single footpeg with an additional footrest surface hinged in the main footpeg. Thus the two parts cannot pivot independently of each other. When this additional footrest part is folded out, it has the same functionality as the invention described in US2012091687. Another version of a single footpeg is shown in US2012274045. These three examples of the prior art has in common that the inventions described is one single pivoting footpeg. In order to maintain the important safety function of pivoting footpegs, this geometrically limits the ultimate width of the footrest surface. This problem with the prior art is solved with the invention described hereinafter as will be explained later.

The second variant of the footboard concept is called "Cross plus". That is a pair of easily detachable extended footrests that can be connected to the original footrests on an off-road motorcycle. Together with the original footrest they turn the original footrest into one footrest with two footrest surfaces. They extend so far rearwards that the foldable functionality of the original footrests will be prevented. They are marketed as an aid for the off-road motorcycle rider who temporarily want to carry a passenger. They are not marketed as an aid for the rider who wants extra support while riding solo in a standing position. The way they are temporarily connected to the original footpegs does not appear to be designed to withstand the potential stresses that will appear if the rider places his weight on them while landing hard after jumps. The invention presented here is designed to withstand these stresses.

Even though these various solutions to some extent, except the "Cross plus" solution, are an attempt to address the problem of rider instability and fatigue, they do not fully solve the inherent stability problem with standing on only one footpeg.

Another problem with the layout with one footpeg on each side of the motorcycle, is that it requires effort to shift the rider weight towards the rear wheel while standing and maintaining the balance. The footpeg position is fixed, so the rider has to use his body as a counterweight to create pull in the handlebars. Shifting the weight quickly towards the rear wheel is often desirable, for example when passing through loose material like sand and deep snow.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow. The invention is defined by the independent patent claim. The dependent claims define advantageous embodiments of the invention.

The invention in accordance with a first aspect provides a footrest arrangement for a motorcycle, which comprises at least two or more individually pivotable footrest devices with footrest surfaces placed with an internal spacing between them so a motorcycle rider can choose whether to stand with his foot on one or more of the footrest surfaces simultaneously.

The basic principle for the invention provided here is that a motorcycle rider will stand more stable on a larger surface, than on a single footrest device (also referred to as footpeg in this introduction). This will allow the rider to use the muscles in his legs to balance and stabilize his body, thus relaxing his upper body, with less fatigue as a result. This will also make it fast and easy to shift the rider's weight towards the rear wheel. Another important positive effect of the invention is that it will reduce the strain on the rider's ankles when landing hard after jumps, as the rider's heel will be supported by the rear footrest or footrests.

According to the invention, this effect is achieved by adding one or more footrest devices behind the original footrest device on each side of the motorcycle, placed relative to each other and close enough to each other in such a way that the rider is enabled to stand with his foot on the footrest devices simultaneously. The area in front of the regular footrest device position is occupied by the gearshift and rear brake controls. The area behind the regular footrest device position is usually not used by the riders, and available for placing additional footrest device structure. Preferably, these added footrest devices are foldable. Both in order to maintain the safety function of having a footrest device that can be simultaneously pushed upwards/backwards when hit by anything, but also to ensure that the added footrest device can be temporarily folded away from the path of the kick starter pedal. This solution can be retrofitted to existing motorcycles or be integrated in the design of new motorcycles. This additional footrest device will dramatically increase the support of the rider's leg, and it will be easy to shift the rider's weight to the rear footrest device, when it is required to quickly redistribute weight towards the rear wheel. The footrest device design has evolved over many years, and these design achievements can be taken advantage of by simply adding one more existing footrest devices on each side of the motorcycle.

The invention provides two or more footrest devices that can pivot independently of each other and pivot without making contact with the motorcycle chassis before they are folded out of the way. The ultimate spacing between them is only limited by the length of the motorcycle rider foot, thus increasing stability for the motorcycle rider greatly compared to prior art.

The invention will make off-road motorcycle riding safer and more fun.

More specifically, the invention relates to a footrest arrangement for a motorcycle, characterized in that the footrest arrangement comprises at least two or more individually pivotable footrest devices with footrest surfaces placed with an internal spacing between them, so a motorcycle rider can choose whether to stand with his foot on one or more of the footrest surfaces simultaneously.

The footrest surfaces may be placed substantially in-plane.

At least some of the footrest devices may be connected to a footrest device bracket via bolts that define slanted pivot axis that allow the footrest devices to fold simultaneously upwards and backwards when hit by an object.

The footrest devices next to the footrest device closest to the front wheel may be arranged to stay in a folded away position when placed in this position by the rider.

The additional footrest device(s) may be connected to a footrest bracket that is arranged to be retrofitted to motorcycles originally equipped with only one foldable footrest device intended for the rider on each side by using the original footrest pivot axis bracket as the main interface point between the additional footrest bracket and a motorcycle frame structure.

The additional footrest device(s) may be connected to brackets that are integrated in the motorcycle frame structure.

The additional footrest device(s) with respect to the footrest device closest to the front wheel may be height-adjustable.

A bracket for the motorcycle sidestand support may be connected to the additional footrest bracket on either the right or the left side of the motorcycle or integrated in one of the additional footrest brackets.

The distance between the footrest surface centres may be between 60 and 250 mm.

BRIEF INTRODUCTION OF THE FIGURES

In the following is described an example of a preferred embodiment illustrated in the accompanying drawings wherein.

DETAILED DESCRIPTION OF THE FIGURES

Figure 1:
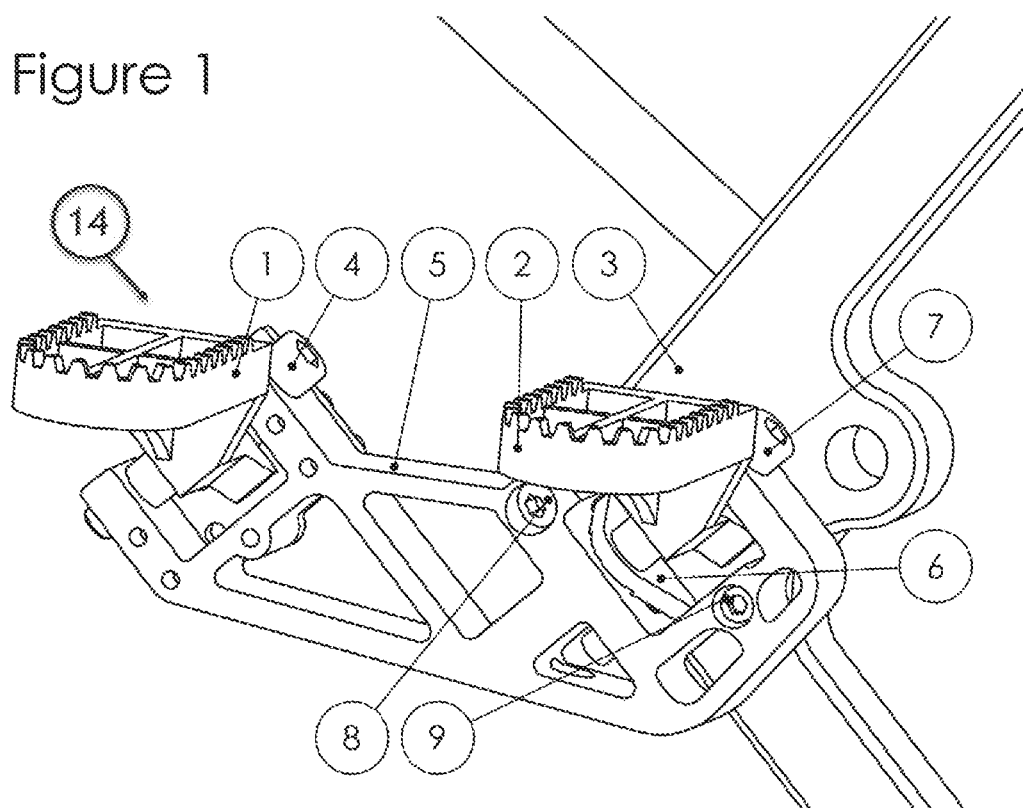
FIG. 1 shows a footrest arrangement in accordance with the invention.

FIG. 1 shows a footrest arrangement 14 with one added foldable footrest device 1 in addition to the footrest device 2, where footrest device 2 is closest to the front wheel of the motorcycle. Both foldable footrest devices 1 and 2 are shown in the regular riding position. The original foldable footrest device 2 has usually spring return to riding position. The additional footrest device 1 is fastened to the motorcycle frame 3 via a bolt 4 and an additional footrest device bracket 5. The bolt 4 defines the pivot axis for the footrest device 1. The additional footrest device bracket 5 is connected to the original footrest device bracket 6 via a bolt 7. This bolt 7 and the top of the original footrest device bracket 6 are transferring the load and torque from the additional footrest device bracket 5 to the motorcycle frame 3. The bolt 7 also defines the pivot axis for footrest device 2. To prevent the additional footrest device bracket from rotating around the bolt 7, two bolts 8 and 9 are added. Bolts 8 and 9 are pretensioned against the motorcycle frame structure.

Figure 2:
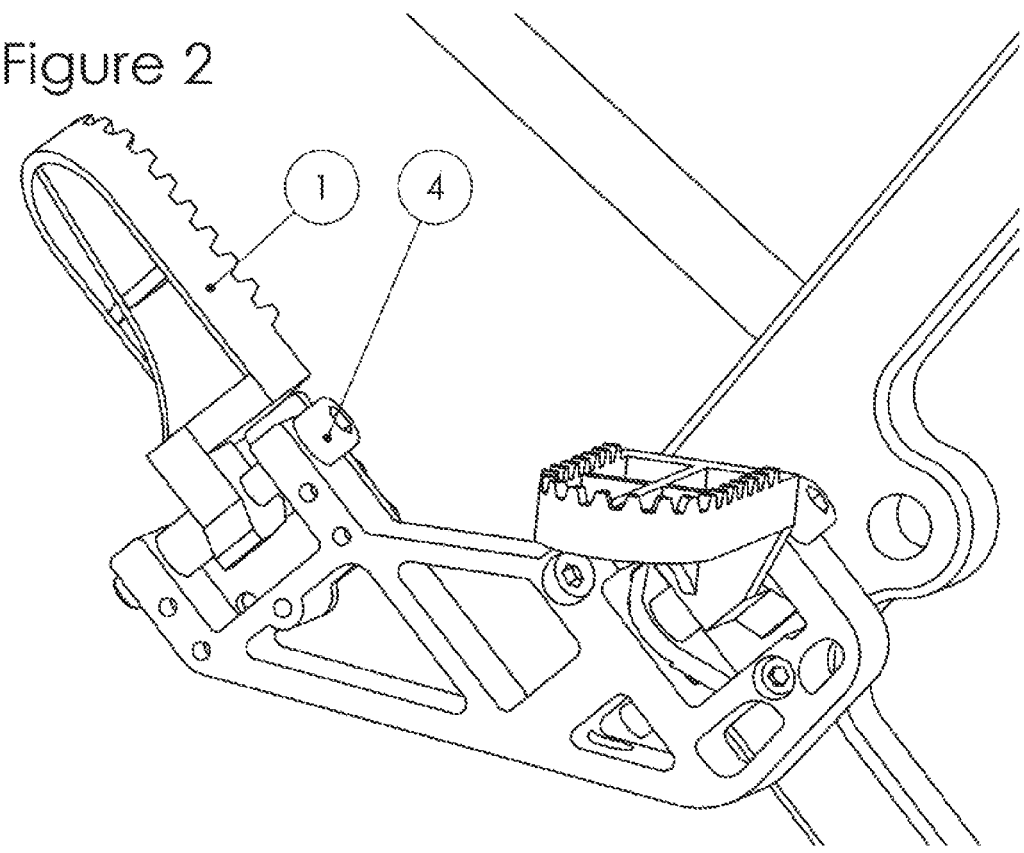
FIG. 2 shows the footrest arrangement of FIG. 1 with one footrest device folded away.

FIG. 2 shows the additional footrest device 1 in a folded away position, rotated around the pivot axis defined by the bolt 4. The additional footrest device 1 may also have spring return, as this is the common solution for regular footrest devices. But it may also stay fixed in the folded position when put there by the rider, either by spring induced friction, or by a spring-loaded detent mechanism. This functionality is important on motorcycles equipped with kick-start pedal. Some riders may also prefer the traditional arrangement with only one footrest device on each side of the motorcycle, when using trials riding techniques in extreme terrain.

Figure 3:
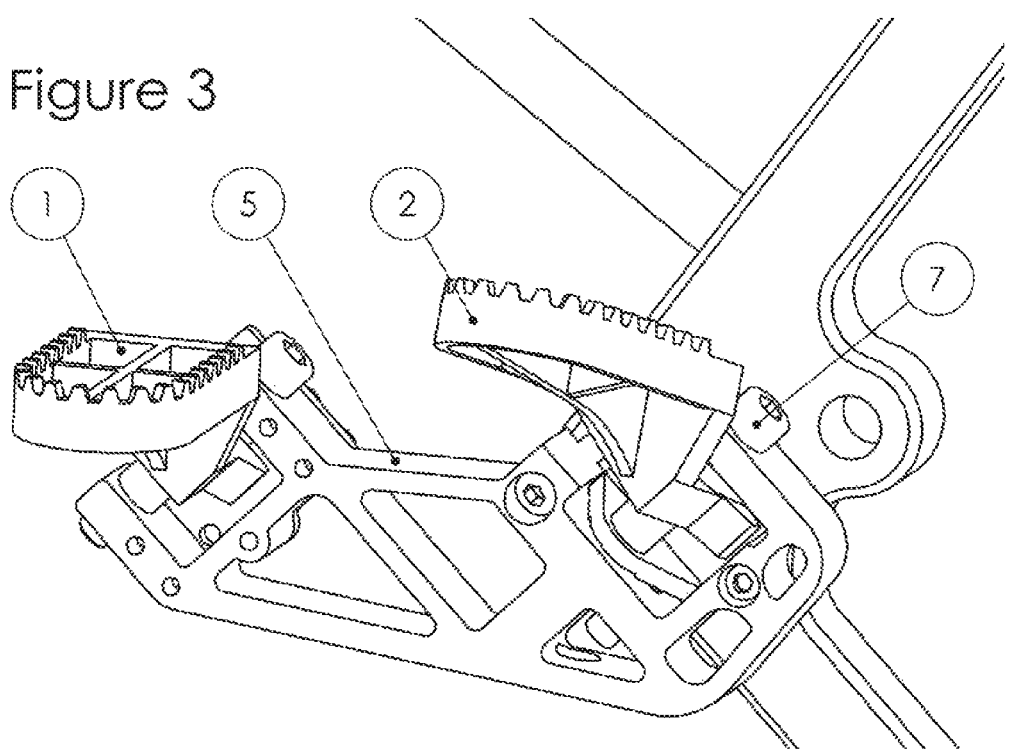
FIG. 3 shows the footrest arrangement of FIG. 1 with the other footrest device being folded.

FIG. 3 shows that the functionality with foldable footrest devices is maintained for the original footrest device 2 pivoting around a pivot axis defined by the bolt 7 even with the additional footrest device bracket 5 installed. The additional footrest device 1 in FIG. 3 is shown in regular riding position.

Figure 4:
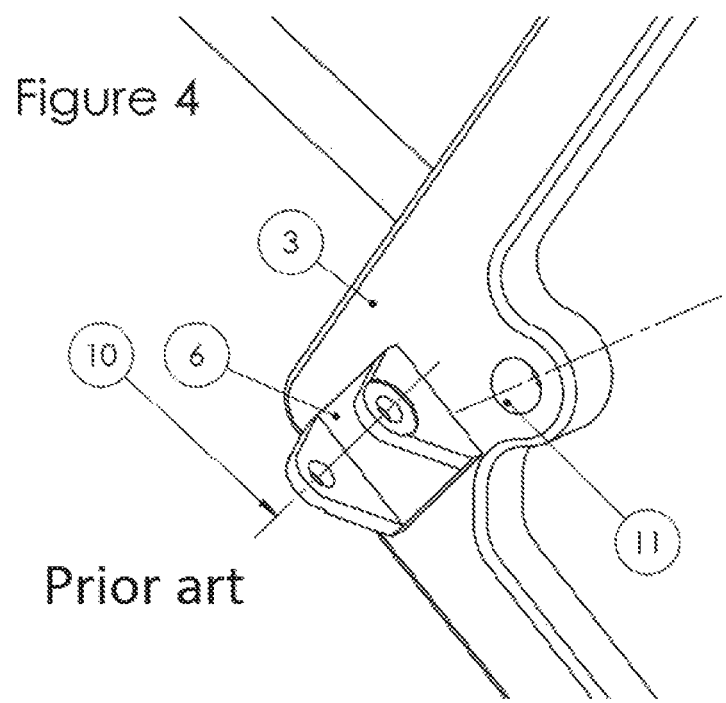
FIGS. 4 and 5 show part of a footrest arrangement as known from the prior art.

FIG. 4 shows prior art, the generic structure solution of all off-road motorcycles, with a footrest device bracket 6 with a slanted pivot axis 10 connected to the motorcycle frame 3. The hole in the motorcycle frame 11 is the hole for the swingarm axle that is connecting the swingarm to the motorcycle frame. This information is only given to describe the approximate generic placement of the footrest device, with respect to the motorcycle frame structure.

Figure 5:
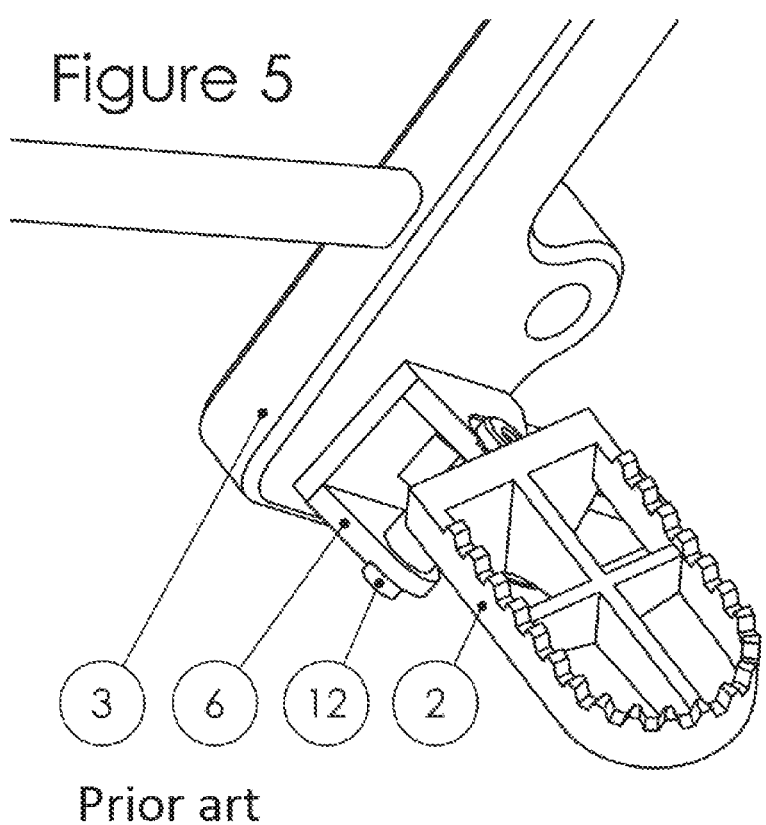

FIG. 5 shows prior art, the generic assembly of the footrest device arrangement used on all off-road motorcycles, with a footrest device 2 assembled to the footrest device bracket 6 with a footrest device axle 12 which defines a slanted pivot axis for the footrest device 2, where the footrest device bracket is either welded or bolted to the motorcycle frame structure 3.

Figure 6:
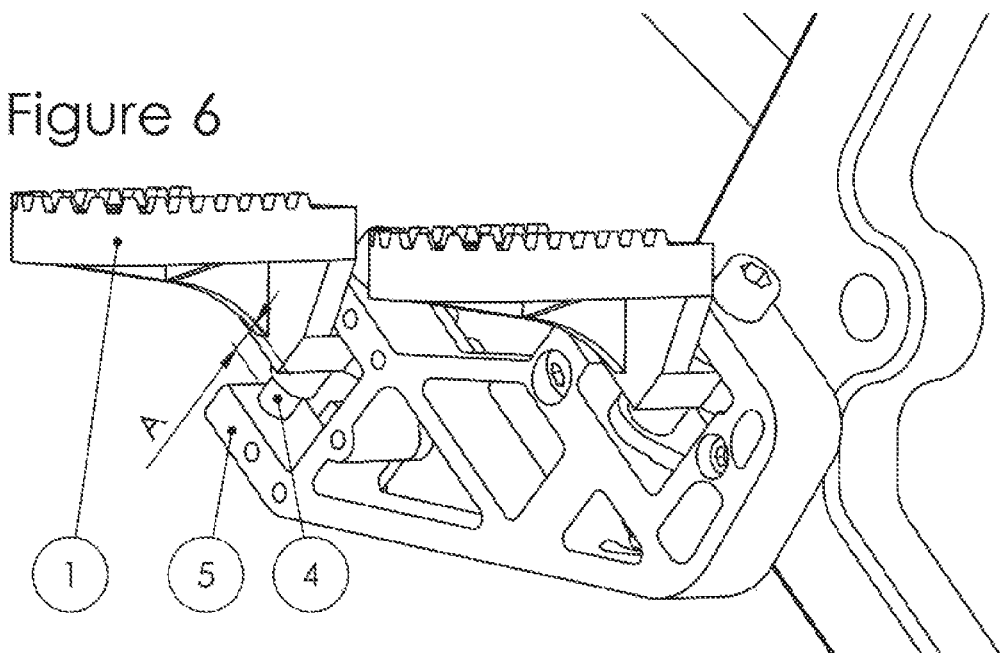
FIGS. 6 and 7 shows further aspect of the footrest arrangement of the invention.

FIG. 6 shows that the additional footrest device bracket 5 is made with a wider gap than the height of the additional footrest device 1 along the pivot axis defined by bolt 4, thus allowing a distance A available for adjusting the height of additional footrest device 1 with respect to the footrest device 2 by adding shim washers between the footrest device 1 and the footrest device bracket 5, according to each individual rider's preferences.

Figure 7:
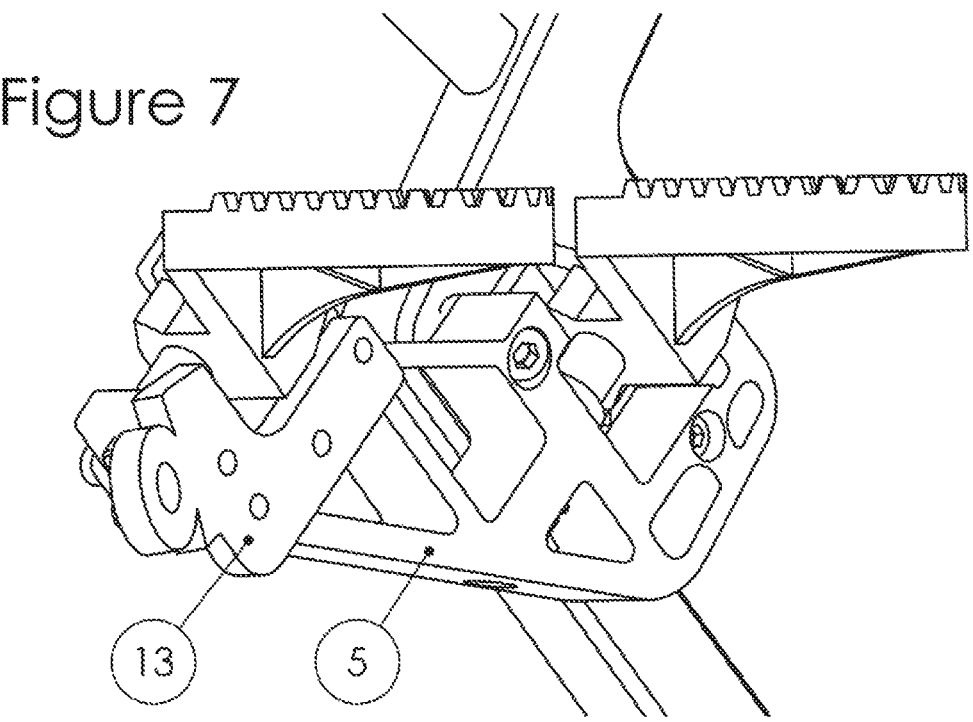

FIG. 7 shows a bracket for the sidestand support of the motorcycle 13, connected to the additional footrest device bracket 5.

It should be noted that the above-mentioned embodiments illustrate rather than limit the invention, and those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these cannot be used to advantage.

The invention claimed is:

1. A two-wheeled motorcycle comprising a footrest arrangement, wherein the footrest arrangement comprises at least two individually pivotable footrest devices having footrest surfaces placed relative to each other and with an internal spacing between the footrest devices configured such that a motorcycle rider is able to stand with a foot on the footrest surfaces simultaneously, wherein a rotational axis of each of the footrest devices is oriented so that the footrest devices are simultaneously foldable upwards and backwards relative to the motorcycle.

2. The two-wheeled motorcycle according to claim 1, wherein the footrest surfaces are placed substantially in-plane.

3. The two-wheeled motorcycle according to claim 1, wherein at least one of the footrest devices is connected to a footrest device bracket via a bolt that defines a slanted pivot axis that allows the at least one of the footrest devices to fold.

4. The two-wheeled motorcycle according to claim 3, wherein one footrest device of the footrest devices is adjacent a front wheel of the motorcycle and wherein at least one other footrest device of the footrest devices is arranged to stay in a folded away position when placed in the folded away position.

5. The two-wheeled motorcycle according to claim 1, wherein the two-wheeled motorcycle is a motorcycle originally equipped with only one foldable footrest device intended for the rider on each side and wherein the footrest devices are connected to a footrest bracket that is arranged to be retrofitted to an original footrest pivot axis bracket of the motorcycle as a main interface point between the footrest bracket and a frame structure of the motorcycle.

6. The two-wheeled motorcycle according to claim 1, wherein the footrest devices are connected to brackets that are integrated into a frame structure of the motorcycle.

7. The two-wheeled motorcycle according to claim 1, wherein one footrest device of the footrest devices is adjacent a front wheel of the motorcycle and wherein at least one other footrest device of the footrest devices is height-adjustable.

8. The two-wheeled motorcycle for a motorcycle according to claim 1, wherein a bracket for a motorcycle sidestand support is at least one of:
   connected to a bracket for the footrest devices that is on a right side or a left side of the motorcycle, and
   integrated in the bracket for the footrest devices.

9. The two-wheeled motorcycle according to claim 1, wherein a distance between a footrest surface center of each of the footrest devices is between 60 and 250 mm.

10. The two-wheeled motorcycle according to claim 2, wherein at least one of the footrest devices is connected to a footrest device bracket via bolts that define a slanted pivot axis that allows the at least one footrest devices to fold simultaneously upwards and backwards.

11. A two-wheeled motorcycle comprising a footrest arrangement, wherein the footrest arrangement comprises at least two individually pivotable footrest devices having footrest surfaces placed relative to each other and with an internal spacing between the footrest devices configured such that a motorcycle rider is able to stand with a foot on the footrest surfaces simultaneously, wherein the footrest devices are each foldable and configured to pivot around a pivot bolt, and wherein the pivot bolt is slanted so that the footrest devices are simultaneously foldable upwards and backwards relative to the motorcycle.

12. The two-wheeled motorcycle according to claim 11, wherein the footrest surfaces are placed substantially in-plane.

13. The footrest arrangement according to claim 11, wherein at least one of the footrest devices is connected to a footrest device bracket via the pivot bolt around which the at least one of the footrest device pivots, said pivot bolt defining a slanted pivot axis that allows the at least one footrest device to fold.

14. The two-wheeled motorcycle according to claim 11, wherein one footrest device of the footrest devices is adjacent a front wheel of the motorcycle and wherein at least one other footrest device of the footrest devices is arranged to stay in a folded away position when placed in the folded away position.

15. The two-wheeled motorcycle according to claim 11, wherein the two-wheeled motorcycle is a motorcycle originally equipped with only one foldable footrest device intended for the rider on each side and wherein the footrest devices are connected to a footrest bracket that is arranged to be retrofitted to an original footrest pivot axis bracket of the motorcycle as a main interface point between the footrest bracket and a frame structure of the motorcycle.

16. The two-wheeled motorcycle according to claim 11, wherein the footrest devices are connected to brackets that are integrated into a frame structure of the motorcycle.

17. The two-wheeled motorcycle according to claim 11, wherein a bracket for a motorcycle sidestand support is at least one of:
   connected to a bracket for the footrest devices that is on a right side or a left side of the motorcycle, and
   integrated in the bracket for the footrest devices.

18. The two-wheeled motorcycle according to claim 11, wherein a distance between a footrest surface center of each of the footrest devices is between 60 and 250 mm.

19. The two-wheeled motorcycle according to claim 11, wherein at least one of the footrest devices is connected to a footrest device bracket via a respective one of the pivot bolts.

20. A two-wheeled motorcycle comprising a footrest arrangement, the footrest arrangement comprising at least two individually pivotable footrest devices with having footrest surfaces placed relative to each other and with an internal spacing between the footrest devices configured such that a motorcycle rider is able to stand with a foot on the footrest surfaces simultaneously, wherein at least one footrest device of the footrest devices is connected to a footrest device bracket via a bolt that defines a slanted pivot axis such that the at least one footrest device is simultaneously foldable upwards and backwards relative to the motorcycle.

21. The two-wheeled motorcycle of claim 20, wherein the footrest surfaces are substantially in-plane.

22. The two-wheeled motorcycle of claim 20, wherein one footrest device of the footrest devices is adjacent a front wheel of the motorcycle and wherein at least one other footrest device of the footrest devices is arranged to stay in a folded away position when placed in the folded away position.

23. The two-wheeled motorcycle according to claim 20, wherein the two-wheeled motorcycle is a motorcycle originally equipped with only one foldable footrest device intended for the rider on each side and wherein the footrest bracket is arranged to be retrofitted to an original footrest pivot axis bracket of the motorcycle as a main interface point between the footrest device bracket and a frame structure of the motorcycle.

24. The two-wheeled motorcycle according to claim 20, wherein the footrest device bracket is integrated into a frame structure of the motorcycle.

25. The two-wheeled motorcycle according to claim 20, wherein a bracket for a motorcycle sidestand support is at least one of:
   connected to the footrest device bracket that is on a right side or a left side of the motorcycle, and
   integrated in one of the footrest device bracket.

26. The two-wheeled motorcycle according to claim 20, wherein a distance between a footrest surface center of each of the footrest devices is between 60 and 250 mm.

* * * * *